(12) United States Patent
LeBlanc

(10) Patent No.: US 8,132,366 B1
(45) Date of Patent: Mar. 13, 2012

(54) MODULAR GERMINATING APPARATUS

(76) Inventor: Neil B. LeBlanc, Kingston, NH (US)

( * ) Notice: Subject to any disclaimer, the term of this patent is extended or adjusted under 35 U.S.C. 154(b) by 175 days.

(21) Appl. No.: 12/719,471

(22) Filed: Mar. 8, 2010

(51) Int. Cl.
A01G 9/02 (2006.01)
A47G 7/02 (2006.01)

(52) U.S. Cl. ............................ 47/67; 47/68; 211/124

(58) Field of Classification Search .......... 47/67, 65.5, 47/66.5, 66.6, 68, 73, 83, 86; 248/200.1, 248/214, 215, 354.5; 211/88.03, 88.01, 105.6, 211/206, 85.23, 124, 89.01, 105.5
See application file for complete search history.

(56) References Cited

U.S. PATENT DOCUMENTS

| | | | |
|---|---|---|---|
| 1,639,551 A | 8/1927 | Booth | |
| 2,223,074 A * | 11/1940 | Martin | 47/68 |
| 2,980,281 A * | 4/1961 | Stewart | 220/482 |
| 3,140,557 A * | 7/1964 | Albrycht | 248/215 |
| 4,048,754 A * | 9/1977 | Laux | 47/68 |
| 4,108,084 A * | 8/1978 | Fink | 108/29 |
| 4,748,770 A | 6/1988 | Cline | |
| 4,896,456 A | 1/1990 | Grant | |
| 6,125,590 A * | 10/2000 | Dionne | 49/453 |
| 7,458,475 B2 | 12/2008 | Ho | |
| 2009/0001235 A1 | 1/2009 | Freudenberger | |

* cited by examiner

Primary Examiner — Kristen Hayes
(74) Attorney, Agent, or Firm — Crossley Patent Law; Mark A. Crossley

(57) ABSTRACT

The modular germinating apparatus provides a plurality of rods, each with an extendable insert whereby total length of the rod and insert is adjustable, the adjusted length selectively maintained by dual, outward pressed lock pins. Rods are positioned as chosen both horizontally and vertically between given objects, such as window sills. A plurality of planters with planter inserts is hung as chosen from the rods with extendable inserts, thereby providing for germinating a multitude of plants simultaneously, with great space efficiency. Each insert provides a plurality of individual compartments, each compartment having drain holes for draining excess liquids from the compartments to the planter below, thereby maintaining optimal germinating environments.

2 Claims, 3 Drawing Sheets

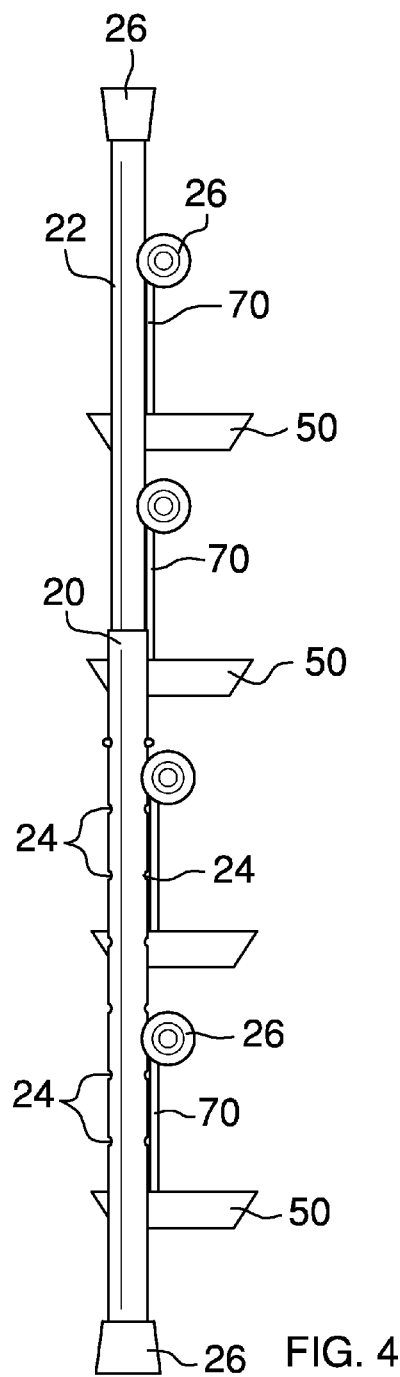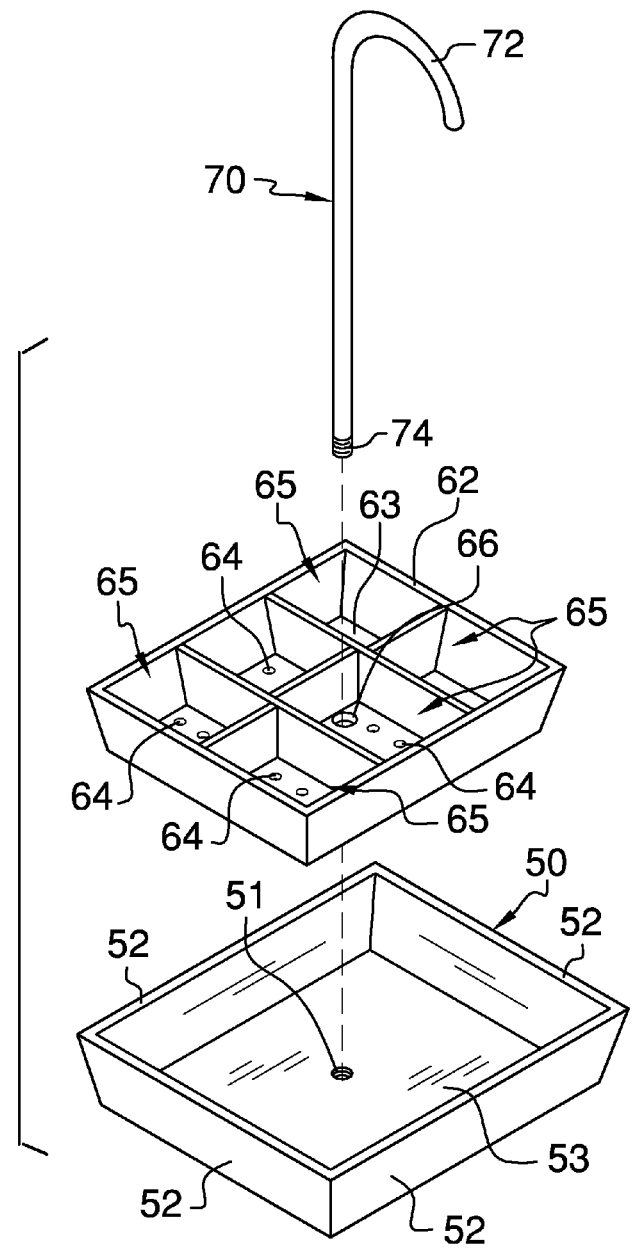
FIG. 4
FIG. 5

MODULAR GERMINATING APPARATUS

BACKGROUND OF THE INVENTION

It is a common practice to germinate plants such and flower and vegetable plants, indoors, where best lighting and temperature conditions can be advantageously used for improved results. Messes on floors, window sills, tables, and other objects are therefore common. Finding sufficient space is also a common problem. The present apparatus provides a unique means for germinating a multitude of plants simultaneously and is especially suited for use in a window.

FIELD OF THE INVENTION

The modular germinating apparatus relates to planters and the like and more especially to an apparatus ideally suited to germinating and caring for a multitude of plants in a space efficient way, while especially being suited to window use.

SUMMARY OF THE INVENTION

The general purpose of the modular germinating apparatus, described subsequently in greater detail, is to provide a modular germinating apparatus which has many novel features that result in an improved modular germinating apparatus which is not anticipated, rendered obvious, suggested, or even implied by prior art, either alone or in combination thereof.

To attain this, the modular germinating apparatus provides a plurality of rods, each rod having an extendable insert whereby total length of the rod and insert is adjustable. Rods and inserts of various length adjustabilities are provided, with special provisions made to accommodate virtually all window sizes, especially. Each rod and rod insert is ended with a rubberized foot for frictional contact for a given surface. The adjustability of each rod with insert is of special importance in design. Each rod has a plurality of diametrically opposed rod orifices. Each insert if equipped with a pair of diametrically opposed insert orifices. Each insert orifice is fed by a lock pin. Each opposed lock pin is fitted within a locking sleeve that is affixed in position within the extendable insert. Each pin is pushed outwardly by a compression spring, and each pin is further equipped with a pin shoulder slideably fitted within the locking sleeve, so that pins are supported for greater strength. Each rod with extendable insert is thereby firmly adjusted to a given length. Rods are positioned as chosen both horizontally and vertically between given objects, such as window sills.

A plurality of planters with planter inserts importantly provide for germinating a multitude of plants simultaneously, with great space efficiency. Each insert provides a plurality of individual compartments, each compartment having drain holes for draining excess liquids from the compartments to the planter below, thereby maintaining optimal germinating environments. Each planter is supported and positioned along the rods with inserts as chosen, by a j-hook on each of the planter supporting ideally removable hangers.

Thus has been broadly outlined the more important features of the improved modular germinating apparatus so that the detailed description thereof that follows may be better understood and in order that the present contribution to the art may be better appreciated.

An object of the modular germinating apparatus is to support a multitude of germinating plants simultaneously.

Another object of the modular germinating apparatus is to support a multitude of germinating plants in the most space efficiency possible.

A further object of the modular germinating apparatus is to provide for fully adjustable fit between opposing objects, such as window sills for example.

An added object of the modular germinating apparatus is to natural drainage of germinating plants.

And, an object of the modular germinating apparatus is to firm support in maintaining adjusted rod and insert lengths.

These together with additional objects, features and advantages of the improved modular germinating apparatus will be readily apparent to those of ordinary skill in the art upon reading the following detailed description of presently preferred, but nonetheless illustrative, embodiments of the improved modular germinating apparatus when taken in conjunction with the accompanying drawings.

In this respect, before explaining the current embodiments of the improved modular germinating apparatus in detail, it is to be understood that the modular germinating apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved modular germinating apparatus. It is therefore important that the claims be regarded as including such equivalent constructions insofar as they do not depart from the spirit and scope of the modular germinating apparatus. It is also to be understood that the phraseology and terminology employed herein are for purposes of description and should not be regarded as limiting.

BRIEF DESCRIPTION OF THE DRAWINGS

FIG. 4 is a lateral elevation view of the apparatus with planters hung by hangers from the rods with extendable inserts.

FIG. 5 is a perspective view of disassembled hanger, planter insert, and planter.

DETAILED DESCRIPTION OF THE DRAWINGS

With reference now to the drawings, and in particular FIGS. 1 through 5 thereof, the principles and concepts of the modular germinating apparatus generally designated by the reference number 10 will be described.

Figure 2:
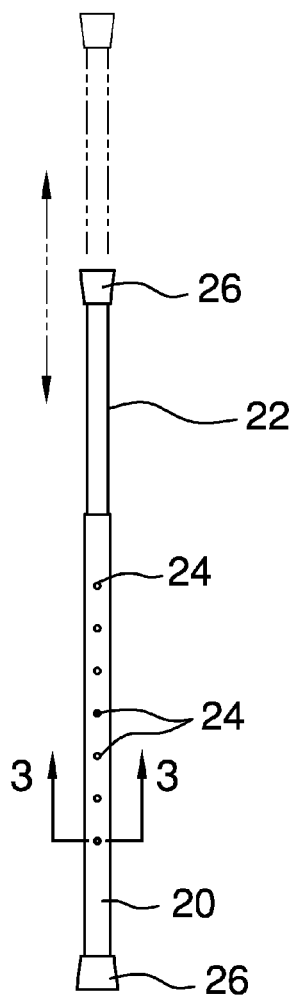
FIG. 2 is a lateral elevation view of one rod with extendable insert.

Referring to FIG. 2, the apparatus 10 partially comprises a plurality of rods 20. Each rod 20 further comprises a plurality of diametrically opposed, paired, spaced apart rod orifices 24. A rubberized foot 26 is disposed laterally on each rod 20. An extendable insert 22 is slideably disposed medially within each rod 20. Rods 20 with extendable inserts 22 are selectively and removably fitted between, for example, existing window sills 12.

Figure 3:
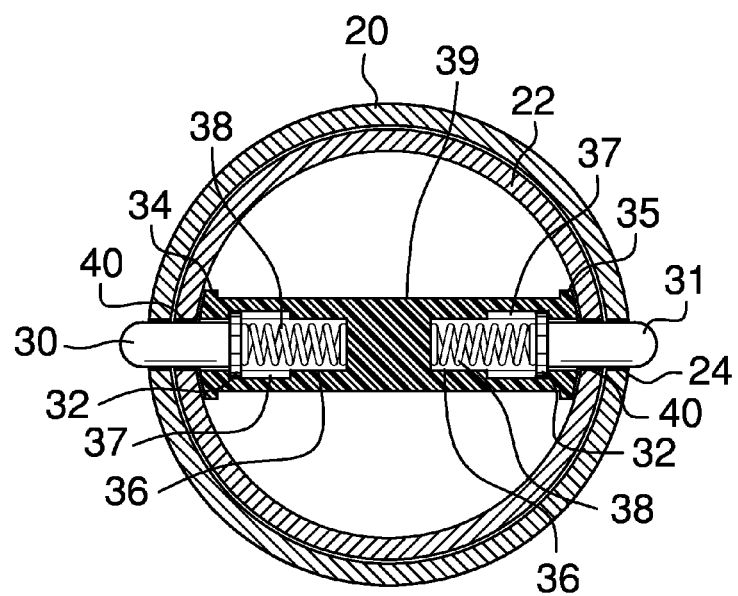
FIG. 3 is a cross sectional view of FIG. 2, taken along the line 3-3.

Referring to FIG. 3, a pair of diametrically opposed insert orifices 40 is disposed on each extendable insert 22. A locking sleeve 39 is disposed between each pair of insert orifices 40. A pair of opposed rounded stops firmly affixes the locking sleeve within the extendable insert 22. The rounded stops comprise the first rounded stop 34 and the second rounded stop 35.

A pair of opposed spaced apart pin chambers 36 is disposed within each locking sleeve 39. A shoulder recess 37 is disposed laterally within each pin chamber 36. The pair of lock pins is slideably disposed within each locking sleeve 39.

The lock pins comprise the first lock pin 30 in one pin chamber 36 and the second lock pin 31 disposed in the opposed pin chamber 36. A pin shoulder 32 is disposed medially on each lock pin. Each pin shoulder 32 is slideably fitted within one of each of the shoulder recesses 37 of one of each of the pin chambers 36. A compression spring 38 is disposed within each pin chamber 36. Each compression spring 37 exerts outward pressure on one of each of the lock pins, whereby each lock pin is removably engaged with one of the rod orifices 24 of the rod 20, thereby selectively affixing one of the extendable inserts 22 within one of the rods 20.

Figure 1:
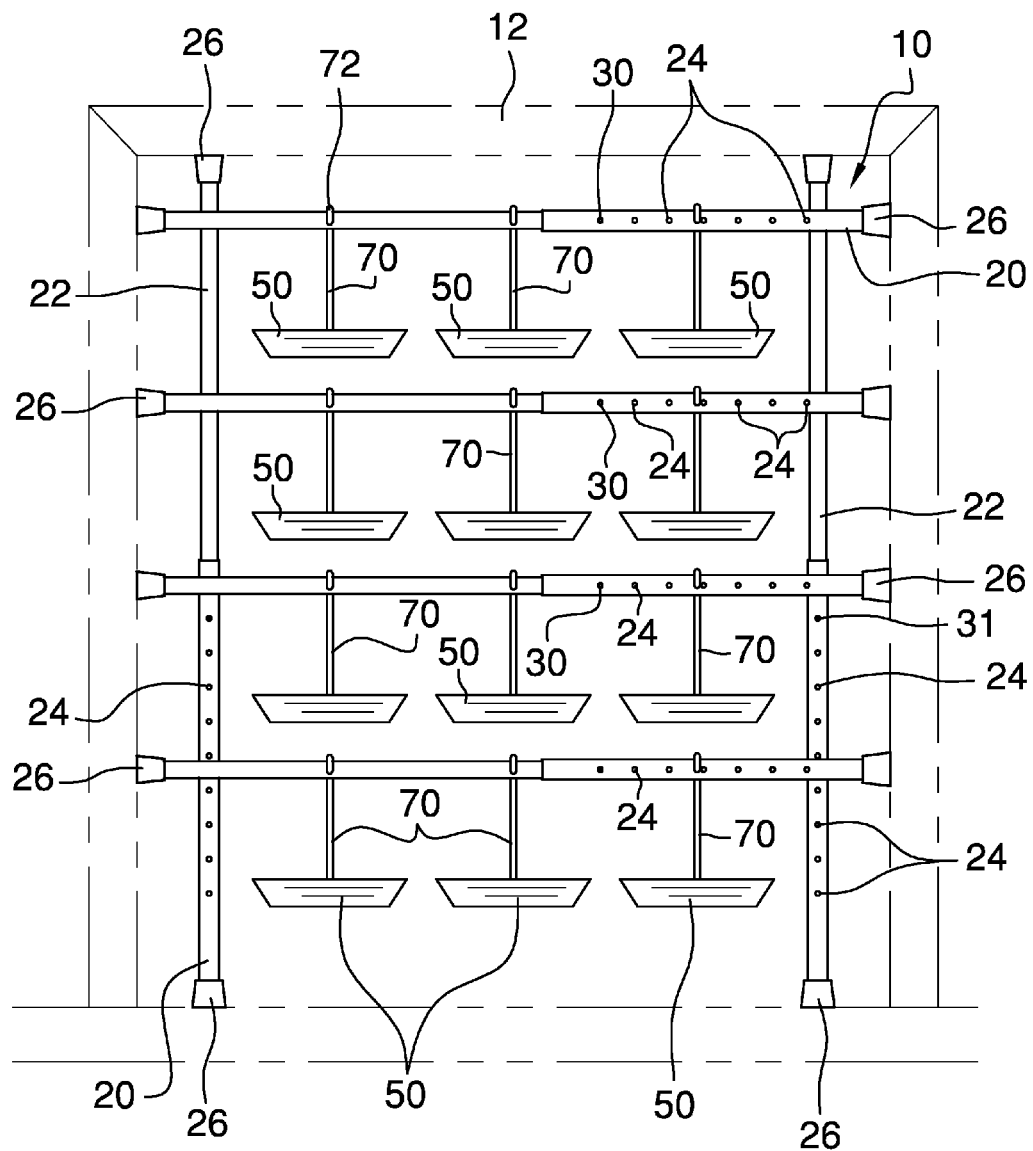
FIG. 1 is a frontal elevation view of the apparatus installed between window sills.

Referring again to FIG. 2 and also to FIG. 1, a rubberized foot 26 is disposed laterally on each extendable insert 22.

Referring to FIG. 5, a plurality of planters 50 is provided. Each planter 50 has a planter floor 53 surrounded by a quartet of outwardly slanted planter walls 52. The female thread 51 is centrally disposed within each planter floor 53. A plurality of planter inserts 62 is provided. Each planter insert 62 has an insert floor 63 surrounded by a quartet of outwardly slanted spaced apart insert walls 67. Each planter insert 62 is removably disposed within one of the planters 50. A plurality of compartments 65 is disposed within each planter insert 62. Each compartment 65 has more than one drain hole 64 in the insert floor 63. The planter insert orifice 66 is disposed centrally within each planter insert 62.

Referring to FIGS. 4 and 5, the plurality of hangers 70 is provided. Each hanger 70 has a male thread 74 spaced apart from a j-hook 72. Each male thread 74 is removably fitted within one planter 50 female thread 51. Each hanger 70 is removably fitted to a rod 20 with extendable insert 22, as desired.

With respect to the above description then, it is to be realized that the optimum dimensional relationships for the parts of the modular germinating apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the modular germinating apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the modular germinating apparatus may be used.

Therefore, the foregoing is considered as illustrative only of the principles of the modular germinating apparatus. Further, since numerous modifications and changes will readily occur to those skilled in the art, it is not desired to limit the modular germinating apparatus to the exact construction and operation shown and described, and accordingly, all suitable modifications and equivalents may be resorted to, falling within the scope of the modular germinating apparatus.

What is claimed is:

1. A modular germinating apparatus comprising, in combination:
   a plurality of rods;
   a plurality of diametrically opposed, paired, spaced apart rod orifices disposed in each rod;
   a rubberized foot disposed laterally on each rod;
   an extendable insert slideably disposed medially within each rod;
   a pair of diametrically opposed insert orifices disposed on each extendable insert;
   a locking sleeve disposed between each pair of insert orifices;
   a pair of opposed rounded stops disposed on each lock sleeve, the rounded stops affixing each lock sleeve within one of each of the extendable inserts;
   a pair of opposed spaced apart pin chambers disposed within each locking sleeve;
   a shoulder recess disposed laterally within each pin chamber;
   a pair of lock pins slideably disposed within each locking sleeve, the lock pins comprising a first lock pin in one pin chamber and a second lock pin in the opposed pin chamber;
   a pin shoulder disposed medially on each lock pin, each pin shoulder slideably fitted within one of each of the shoulder recesses of one of each of the pin chambers;
   a compression spring disposed within each pin chamber, each compression spring exerting outward pressure on one of each of the lock pins, whereby each lock pin is removably engaged with one of the rod orifices, thereby selectively positioning one of the extendable inserts within one of the rods;
   a rubberized foot disposed laterally on each extendable insert;
   a plurality of planters, each planter having a planter floor surrounded by a quartet of planter walls;
   a plurality of planter inserts removably disposed within each planter;
   a plurality of compartments disposed within each planter insert, each compartment having more than one drain hole in the insert floor;
   a plurality of hangers disposed upwardly from each planter and planter insert, each hanger removably fitted on a rod with an extendable insert.

2. A modular germinating apparatus comprising, in combination:
   a plurality of rods;
   a plurality of diametrically opposed, paired, spaced apart rod orifices disposed in each rod;
   a rubberized foot disposed laterally on each rod;
   an extendable insert slideably disposed medially within each rod;
   a pair of diametrically opposed insert orifices disposed on each extendable insert;
   a locking sleeve disposed between each pair of insert orifices;
   a pair of opposed rounded stops disposed on each lock sleeve, the rounded stops affixing each lock sleeve within one of each of the extendable inserts;
   a pair of opposed spaced apart pin chambers disposed within each locking sleeve;
   a shoulder recess disposed laterally within each pin chamber;

a pair of lock pins slideably disposed within each locking sleeve, the lock pins comprising a first lock pin in one pin chamber and a second lock pin in the opposed pin chamber;

a pin shoulder disposed medially on each lock pin, each pin shoulder slideably fitted within one of each of the shoulder recesses of one of each of the pin chambers;

a compression spring disposed within each pin chamber, each compression spring exerting outward pressure on one of each of the lock pins, whereby each lock pin is removably engaged with one of the rod orifices, thereby selectively anchoring one of the extendable inserts within one of the rods;

a rubberized foot disposed laterally on each extendable insert;

a plurality of planters, each planter having a planter floor surrounded by a quartet of outwardly slanted planter walls;

a female thread centrally disposed within each planter floor;

a plurality of planter inserts, each insert having an insert floor surrounded by a quartet of outwardly slanted spaced apart insert walls, each planter insert removably disposed within one of the planters;

a plurality of compartments disposed within each planter insert, each compartment having more than one drain hole in the insert floor;

a planter insert orifice disposed centrally within each planter insert;

a plurality of hangers, each hanger having a male thread spaced apart from a j-hook, each male thread removably fitted within one planter female thread, each hanger removably fitted to a rod with an extendable insert.

* * * * *